(12) United States Patent
Iida et al.

(10) Patent No.: US 7,254,743 B2
(45) Date of Patent: Aug. 7, 2007

(54) SERVICE PROCESSING SYSTEM AND METHOD

(75) Inventors: Hiroshi Iida, Kawasaki (JP); Tohru Mori, Kawasaki (JP); Kenji Kawase, Kawasaki (JP); Hiroomi Ichiba, Kawasaki (JP); Satoshi Kaito, Kawasaki (JP); Reiko Aoyama, Kawasaki (JP); Noriyuki Abe, Kawasaki (JP); Nobuyuki Takao, Kawasaki (JP); Yumiko Koga, Kawasaki (JP); Mitsushige Oguri, Kawasaki (JP); Takanobu Suzuki, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 476 days.

(21) Appl. No.: 10/661,598

(22) Filed: Sep. 15, 2003

(65) Prior Publication Data
US 2004/0172602 A1  Sep. 2, 2004

(30) Foreign Application Priority Data
Feb. 28, 2003  (JP) ............................. 2003-053292

(51) Int. Cl.
*G06F 11/00* (2006.01)
(52) U.S. Cl. ......................................... 714/15; 714/44
(58) Field of Classification Search ................. 714/15, 714/40, 43, 44
See application file for complete search history.

(56) References Cited

U.S. PATENT DOCUMENTS

| 4,697,233 A | * | 9/1987 | Scheuneman et al. | ...... 711/169 |
| 6,279,117 B1 | * | 8/2001 | Takeda | ........................... 714/5 |
| 6,388,760 B2 | * | 5/2002 | Kadota et al. | ............. 358/1.14 |
| 6,885,469 B1 | * | 4/2005 | Tanimoto | .................... 358/1.14 |

FOREIGN PATENT DOCUMENTS

| JP | A 2001-195295 | 7/2001 |
| JP | A 2001-325389 | 11/2001 |
| JP | A 2002-99686 | 4/2002 |

* cited by examiner

*Primary Examiner*—Scott Baderman
*Assistant Examiner*—Joshua Lohn
(74) *Attorney, Agent, or Firm*—Oliff & Berridge, PLC

(57) ABSTRACT

The present invention provides increased processing efficiency for service of performing predetermined processes on document data through cooperation among the processes over a network. If an error exists during document input in an input plug-in element before a start of rule-based processing, when documents are captured from the input plug-in element, contents of the error are stored in an error history memory, and documents normally inputted are subjected to processing of processing plug-in and output plug-in elements according to the rule. Also when an error occurs during the rule-based processing, the contents of the error are stored in the error history memory, and the rule-based processing is continued for normal documents. Error histories are referred to, and if an error exists, the error contents are reported on the basis of the error histories.

13 Claims, 7 Drawing Sheets

SERVICE PROCESSING SYSTEM AND METHOD

BACKGROUND OF THE INVENTION

1. Field of the Invention

The present invention relates to a service processing system and method, and more particularly to a service processing system and method that provide the service of performing predetermined processes on document data inputted from an input device through cooperation among the processes over a network.

2. Description of the Related Art

Conventionally, there have been network systems that share paper documents and electronic information by connecting the following over a network: a scanner, facsimile (hereinafter referred to as FAX), copying device, or a multi-function device combining them, a personal computer, and a mail server.

Such network systems capture document files from an input system such as a scanner and a paper-less FAX for reading originals, perform image processing, character recognition, and other processes of a processing system, and distribute the document files to the outside through an output system such as a printer, a mail server, and the like.

Usually, document file capturing, processing, and distribution are performed independently of each other. Therefore, if the operator wants to continuously perform document file capturing, processing, and distribution, predetermined settings must be performed for each of the capturing, processing, and distribution. In other words, the operator must open the respective windows on the capturing, processing, and distribution to perform predetermined input operations; this has been very inconvenient.

For this reason, a work flow system has been conventionally introduced which performs a series of processes from input to output in a sequence defined in advance through cooperation among them over a network. With work flows commonly used in offices such as approval and circulation in mind, many work flow systems are developed as unmodified electronic versions of existing paper-based application systems (refer to, e.g., Patent Reference 1, Patent Reference 2, and Patent Reference 3).

[Patent Reference 1]

Japanese Published Unexamined Patent Application No. 2002-99686

[Patent Reference 2]

Japanese Published Unexamined Patent Application No. 2001-325389

[Patent Reference 3]

Japanese Published Unexamined Patent Application No. 2001-195295

However, conventional work systems have provided specific services and have been unable to address irregular processes. Specifically, if an error such as a receive error during FAX receive occurs in the middle of processing, the processing is discontinued, and even if the processing is normal up to the middle of the processing, the processing must be retried from the beginning of the a work flow; processing efficiency has been bad. Particularly, to users needing a speedy response, such immediate discontinuation of processing due to an error is annoying.

SUMMARY OF THE INVENTION

The present invention has been made to solve the above problems and provides a service processing system and that provide increased processing efficiency for service of performing predetermined processes on document data through cooperation among the processes over a network.

To solve the above problems, according to an aspect of the present invention, a service processing system provides service of performing processes on document data through cooperation among the processes over a network. The system includes a control part that continues, if an error occurs in the document data in the course of the processes, the processes on the document data, except in locations concerned in the error.

According to another aspect of the present invention, a service processing method provides service of performing processes on document data through cooperation among the processes over a network. The service processing method including the steps of performing the processes on document data, controlling to continue, if an error occurs in the document data in the course of the processes, the processes on the document data, except in locations concerning the errors.

According to another aspect of the present invention, a service processing device in a service processing system provides service of performing processes on document data through cooperation among the processes over a network. The device includes a control part that continues, if an error occurs in the document data in the course of the processes, the processes on the document data, except in locations concerned in the error.

BRIEF DESCRIPTION OF THE DRAWINGS

Preferred embodiment of the present invention will be described in detail based on the followings, wherein.

DESCRIPTION OF PREFERRED EMBODIMENTS

Next, an embodiment of the present invention will be described with reference to the drawings.

[System Configuration]

Figure 1:
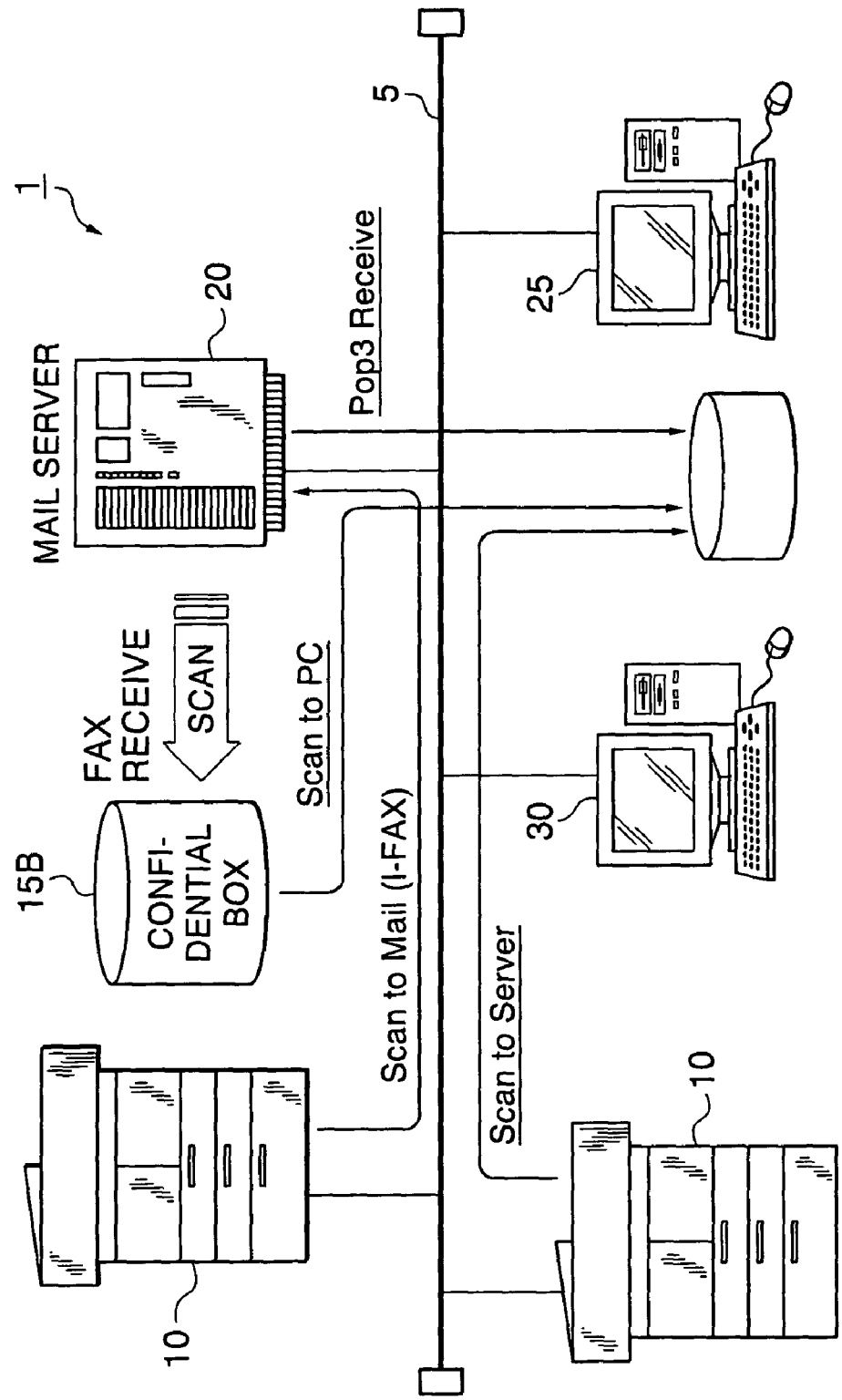
FIG. 1 is a diagram showing a rough configuration of a document shared network system according to an embodiment of the present invention.

FIG. 1 is a diagram showing a rough configuration of a document shared network system 1 according to an embodiment of the present invention.

The document shared network system 1 includes: plural multi-function devices 10 having print functions, scanner functions, and facsimile functions; a mail server 20 sending and receiving electronic mail; plural terminals 25; and a control device 30 that captures documents from predetermined capture destinations and performs predetermined processing for them, then distributes them to predetermined distribution destinations. Although the documents here refer to document data of the present invention, primarily image data on documents, the documents may contain text data depending on states of processing; there are no special limitations on the documents.

The multi-function devices 10, the mail server 20, the terminals 25, and the control device 30 are connected to each other through a network 5. To the network 5, a printer, a scanner, and a facsimile, though not shown, may be connected.

Figure 2:
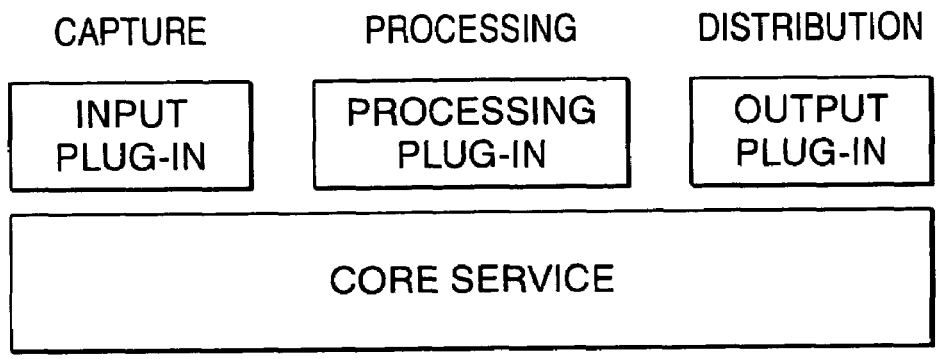
FIG. 2 is a diagram explaining an outline of processing of the document shared network system.

FIG. 2 is a diagram explaining an outline of processing of the document shared network system 1. Although the multi-function devices 10, the mail server 20, and the terminals 25 are connected to each other through a network 5, they usually operate independently of each other. Accordingly, the control device 30 provides core services by setting a capture destination, processing method, and distribution destination in the document shared network system 1, and automatizing and routinizing a series of processes such as document capture, processing, and distribution.

A definition of automatizing and routinizing a series of processes is referred to as a rule. Setting of rules will be described later. Application programs providing the respective specific functions of capture, processing method, and distribution are referred to as input plug-in, processing plug-in, and output plug-in, respectively.

Figure 3:
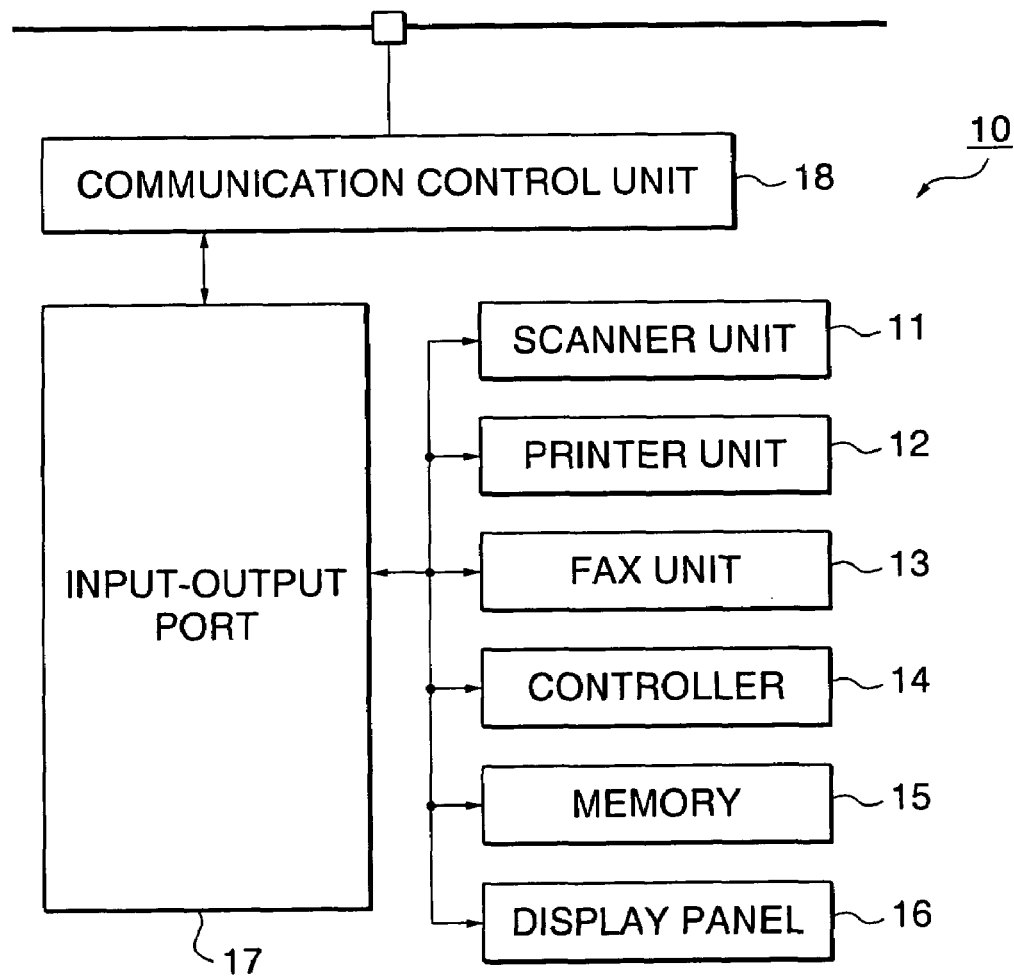
FIG. 3 is a block diagram showing a configuration of a multi-function device.

FIG. 3 is a block diagram showing a configuration of the multi-function device 10.

The multi-function device 10, which provides input plug-in and output plug-in functions, includes: a scanner unit 11 that reads images recorded in documents; a printer unit 12 that records electrostatic latent images in photoconductive materials, develops the electrostatic latent images using a monochrome toner or color toner, and transfers the developed images to recording paper for output; and a FAX unit 13 that sends and receives facsimile telegrams.

The multi-function device 10 further includes: a controller 14 that controls the whole of the system; a memory 15 that stores image data read by the scanner unit 11, image data received through the network 5, and data of telegrams received by FAX; a display panel 16 that displays operation screens having icons and inputs operation information in response to a touch on the icons; an input-output port 17 for inputting and outputting data; and a communication control unit 18 performing communications with devices connected to the network.

The scanner unit 11, the printer unit 12, the FAX unit 13, the controller 14, the memory 15, the display panel 16, and the input-output port 17 are connected to each other through a bus. The input-output port 17 is connected to the network 5 through the communication control unit 18. The scanner may be incorporated as part of the FAX unit 13.

Usually, when an error occurs during processing, the multi-function device 10 creates fault information 19 identifying the error and stores the created fault information 19 in an error history memory 15A allocated in a predetermined storage area of the memory 15 (see FIG. 8). The fault information includes a job ID for identifying a job, a page number in which the error occurred, the cause of the error, and the like. The causes of errors include communication errors (so-called K7 errors) during FAX receive, decode errors indicating failure in decoding receive data and scanning data, and hardware errors such as a paper jam of read originals during scanning by use of an automatic document feeding function.

In the multi-function device 10 of the present invention, the predetermined storage area of the memory 15 is partitioned into plural confidential boxes 15B, which are managed by box numbers (e.g., 1 to 300). The multi-function device 10 assigns file names to documents scanned in the scanner unit 11 and documents received in the FAX unit, stores the documents in the confidential boxes 15B, and sends the documents to sending destinations set in advance for the confidential boxes 15B.

The mail server 20 provides input plug-in and output plug-in functions and sends and receives electronic mail of the terminals 25 connected to the network 5.

The terminals 25, so-called personal computers, provides input plug-in, processing plug-in, and output plug-in functions. The terminals 25 sends and receives electronic mail to and from the outside through the mail server 20, stores documents in a file folder, and performs predetermined image processing for documents.

The control device 30 sets a rule as a work flow and performs a series of processes such as document capturing, processing, and distribution on the basis of the rule. The control device 30 may also serve as processing plug-in.

Figure 4:
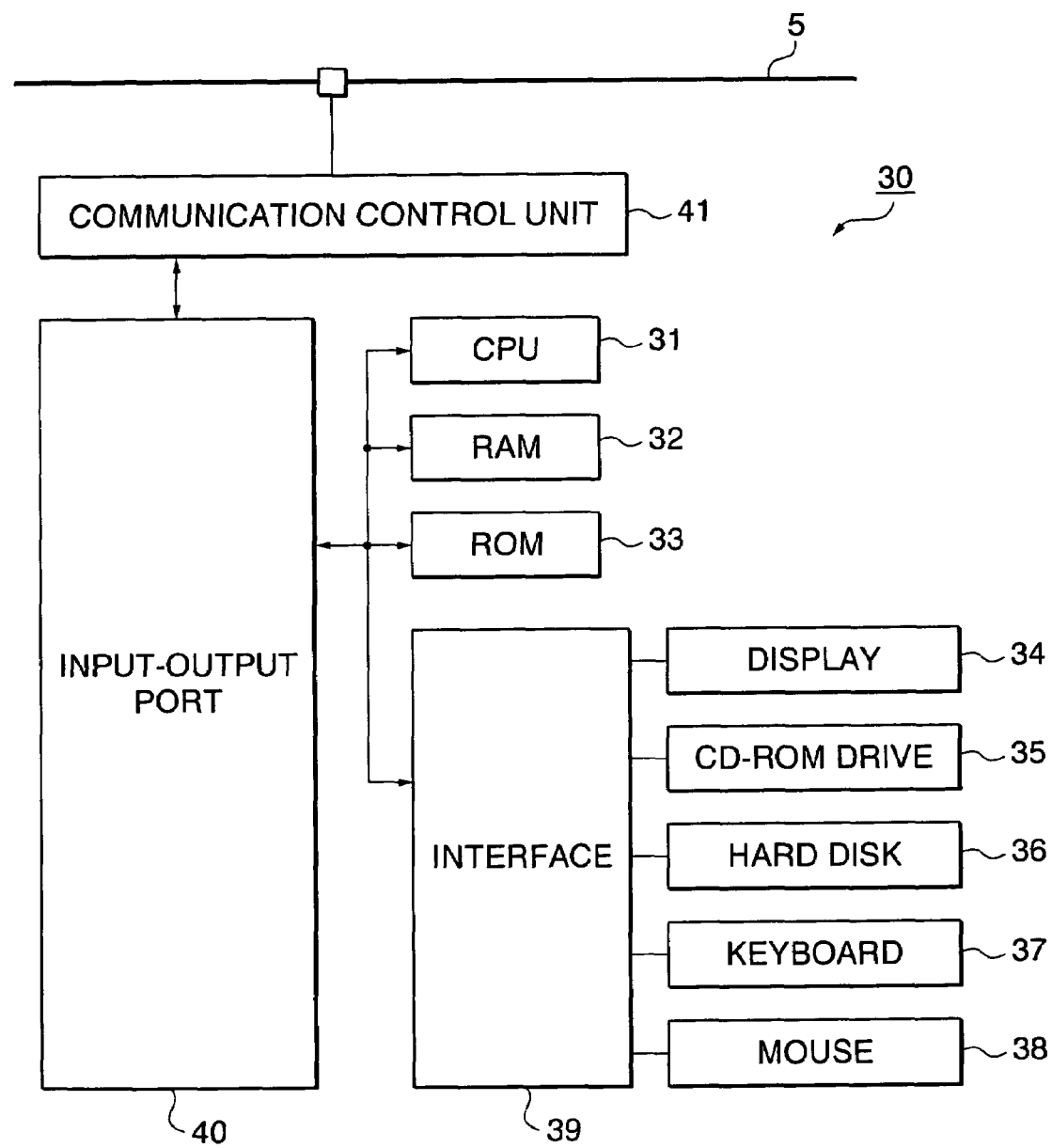
FIG. 4 is a block diagram showing a configuration of a control device.

FIG. 4 is a block diagram showing a configuration of the control device 30.

The control device 30 includes: a CPU (Central Processing Unit) 31 that controls the whole of the system; RAM (Random Access Memory) 32 as a work area that temporarily stores data; ROM (Read Only Memory) 33 that stores the control programs of the CPU 31 and the like; a display 34 that displays a rule setting screen for setting rules, and the like; and a CD-ROM drive 35.

The control device 30 further includes: a hard disk drive 36 that stores and reads a program for automatizing and routinizing a series of processes such as document capturing, processing, and distribution, application programs for functioning as processing plug-in, and predetermined data and the like; a keyboard 36 that inputs text, symbols, and the like; a mouse 38 as a pointing device; an interface 39 to which these components are connected; an input-output port 40; and a communication control unit 41.

The CPU 31, RAM 32, ROM 33, interface 39, and input-output port 40 are connected to the communication control unit 41 that performs communications with other devices connected to the network 5 such as the multi-function device 10.

The keyboard 37 is used to input command information directly by an operator when various setting screens are displayed in the display 34. The mouse 38, when various setting screens are displayed in the display 34, is used to select displayed items or input the contents of setting commands.

[Example of Rules]

Figure 5:
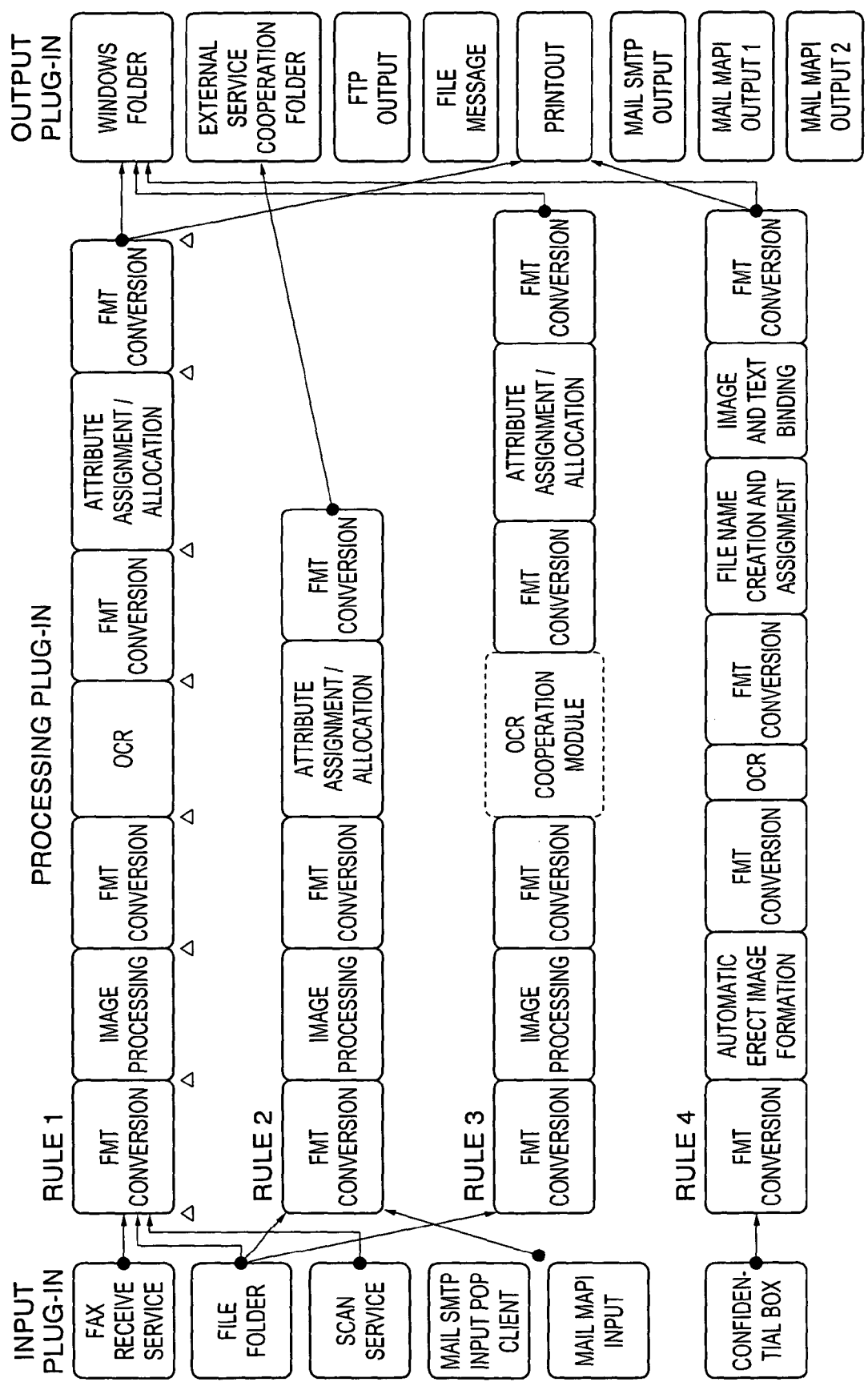
FIG. 5 is a diagram explaining an example of rules that can be created by arbitrarily combining input plug-in, processing plug-in, and output plug-in elements.

FIG. 5 is a diagram explaining an example of rules that can be created by arbitrarily combining input plug-in, processing plug-in, and output plug-in elements by the control device 30.

For example, rule 1 defines capturing documents from plural input plug-in elements (FAX receive service, file folder, scan service), performing plural processing plug-in elements (image processing, optical character recognition (OCR), and attribute assignment/allocation), and distributing the documents subjected to these processes to plural output plug-in elements (file folder and print output).

Rule 2 defines capturing documents from a file folder and Mail_MAPI input, performing image processing and attribute assignment/allocation, and distributing the processed documents to an external service cooperation folder.

Rule 3 defines capturing documents from a file folder, performing image processing, OCR cooperation module, and attribute assignment/allocation, and distributing the processed documents to a file folder.

Rule 4 defines capturing documents from a confidential box 15B of a given box number, performing automatic erect image formation, OCR, file name creation and assignment, image and text binding, and distributing the document subjected to these processes to plural output plug-in elements (file folder and print output).

The rules 1 to 4 perform format (FMT) conversion necessary for a following process before and after each processing plug-in element.

Input plug-in elements include, as shown in FIG. 5, FAX receive service, file folder, scan service, Mail_SMTP input, POP client, Mail_MAPI input, and the like. The confidential box shown in FIG. 1 is also included in input plug-in elements.

Processing plug-in elements include image processing, OCR, attribute assignment/allocation, OCR cooperation module, and the like.

Output plug-in elements include file folder, external service cooperation folder, ftp output, file message, Mail_SMTP output, and Mail_MAPI output. However, input, processing, and output plug-in elements are not limited to the above-described ones.

[Functional Configuration of the Control Device]

Figure 6:
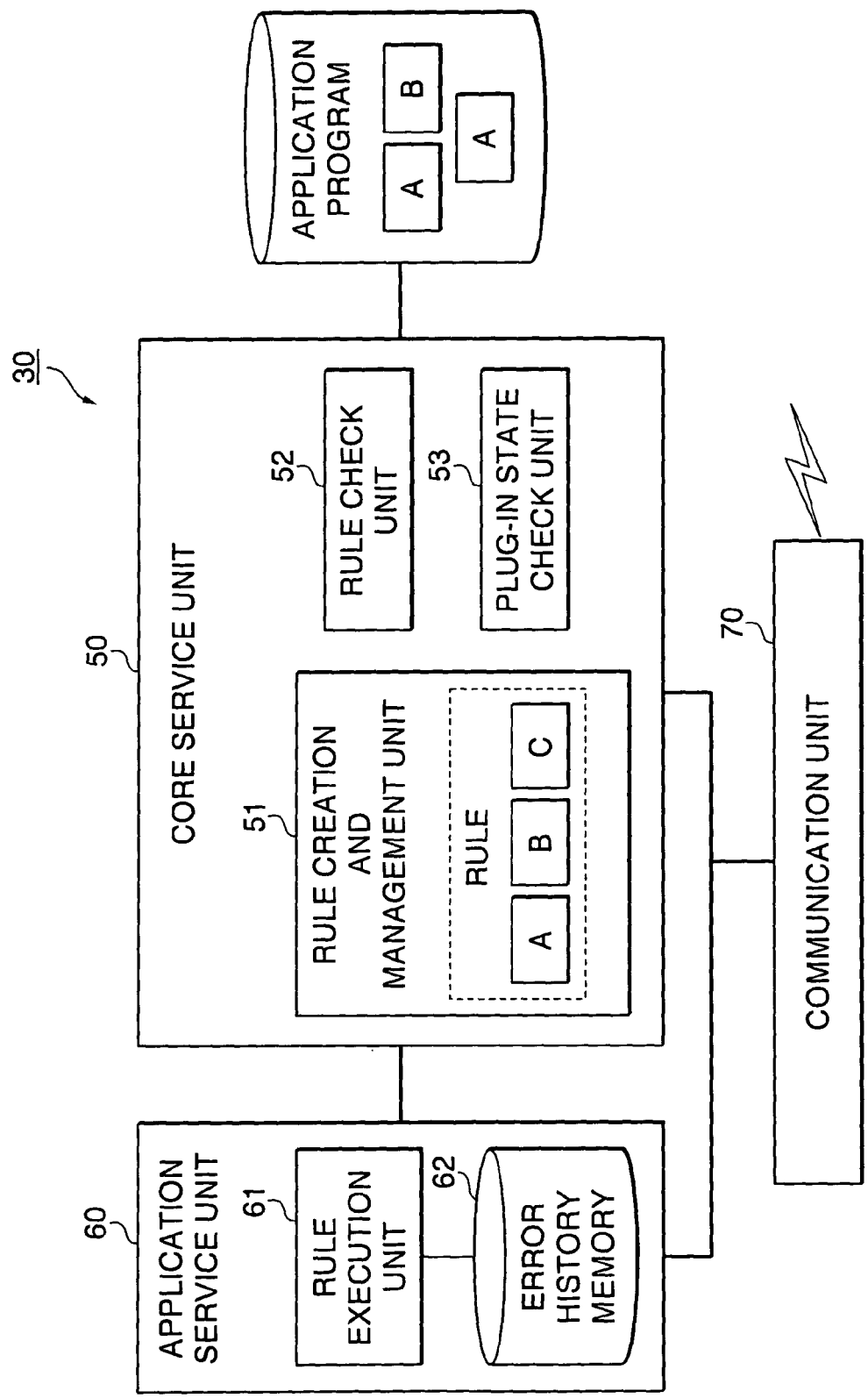
FIG. 6 is a block diagram showing a functional configuration of the control device.

Referring to FIG. 6, a description is made of a function for automatizing and routinizing a series of processes including creation of the above-described rules, document capturing, and processing and distribution in the control device 30 of this embodiment. FIG. 6 is a diagram showing a functional configuration formed in the control device 30, using hardware resources shown in FIG. 4 by program execution in the CPU 31.

As shown in FIG. 6, in the control device 30, functions of a core service unit 50, an application service unit 60, and a communication unit 70 are formed.

The core service unit 50 is created by executing control programs resident in the memory in the CPU 31 when the control device 30 is activated. The core service unit 50 includes: a rule creation and management unit 51; a rule check unit 52; and a plug-in state check unit 53.

The rule creation and management unit 51 creates rules and manages the created rules. Specifically, a rule setting screen (not shown) is displayed on the display 34, capturing destinations, processing methods, and distribution destinations are set based on information inputted by a user through the rule setting screen, and rules defining a series of processes including document capturing, processing, and distribution are created. The created rules are stored in the hard disk drive 36 through the RAM 32 or external storage media not shown.

The rule creation and management unit 51 accepts corrections of stored rules from the rule setting screen (not shown) and can update the stored rules on the basis of correction results. Furthermore, the rule creation and management unit 51 manages only currently executable rules of created rules.

The rule check unit 52 checks a created rule for validity. Specifically, on the basis of a valid input-output data format of a particular plug-in element, the rule check unit 52 decides whether format mismatch exists between the plug-in element and ones preceding and following it, thereby determining whether the rule is valid. On the basis of the checking result, the rule creation and management unit 51 reports an error to the user to prompt him or her to correct the rule, and accepts rule corrections.

The plug-in state check unit 53 checks a state (ready for operation or not) of each plug-in elements. On the basis of the checking result of the plug-in state check unit 53, the rule creation and management unit 51 determines currently executable rules, and reports an error if an inexecutable rule is specified to be activated.

The application service unit 60 operates when a predetermined rule execution timing is reached; that is, it is formed when the CPU 31 performs processing according to the rule. It includes a rule execution unit 61 and an error history memory 62.

The rule execution unit 61, corresponding to functions of a control part of the present invention, performs control processing so that a series of processes are executed according to rules, and performs control to continue processing if possible even if an error occurs. Rules executed in the rule execution unit 61 are controlled by the rule creation and management unit 51.

The rule execution unit 61, when an error occurs during rule execution, stores error information such as the cause of the error, a job number, and a page number in the error history memory 62 as an error history. The error history memory 62 corresponds to a storage part of the present invention. As the error history memory 62, for example, a predetermined storage area of the hard disk drive 36 can be used.

The error history stored in the error history memory 62, after the rule execution by the rule execution unit 61, is used to determine whether an error occurred during the rule execution and report an error if it occurred.

The communication unit 70 performs communications with other devices through the network 5 to send and receive data to and from other devices by the core service unit 50 and the application service unit 60, check states of plug-in elements implemented in the other devices, and report errors to the other devices.

[Execution of Rules]

The control device 30, when a predetermined rule execution timing is reached, on the basis of rules stored in the hard disk drive 36 and external storage media, performs a series of processes, including capturing of documents from the document shared network system 1, processing of the documents, and distributing them to predetermined distribution destinations.

Figure 7:
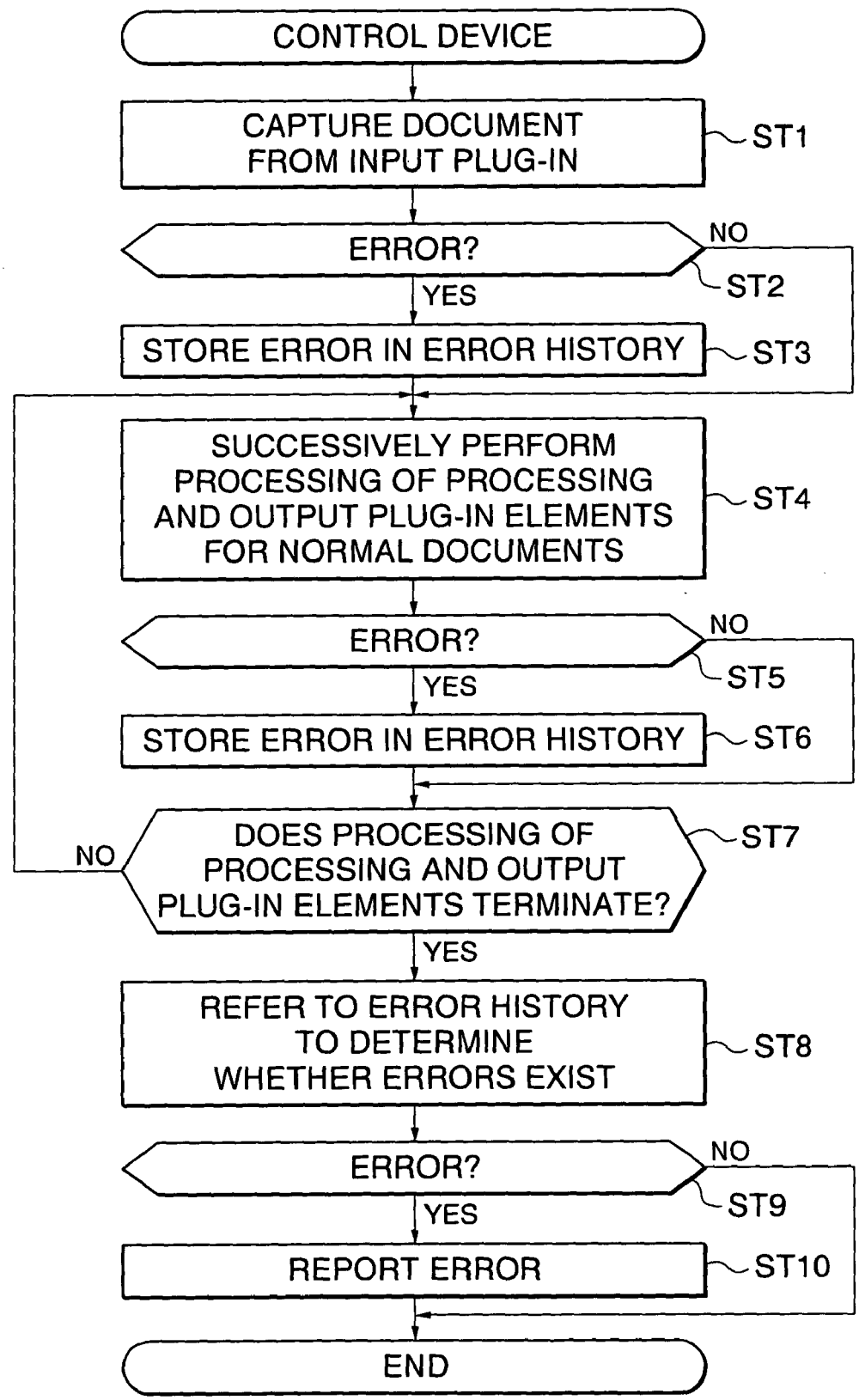
FIG. 7 is a flowchart showing a procedure when a CPU of the control device performs processing according to a rule.

FIG. 7 is a flowchart showing a procedure when the CPU 31 of the control device 30 performs processing according to a rule. The CPU 31 of the control device 30 executes steps ST1 to ST10 described below.

This processing is described using the rule 4 shown in FIG. 5 as an example. The rule 4 is executed when documents obtained by subjecting an original to scanning or FAX receive by the scanner unit 11 or FAX unit 13 are stored in a confidential box 15B of a specified box number. In other words, the scanner unit 11 or FAX unit 13 is used as an input part of the present invention, and the multi-function device 10 is a device on the network that inputs document data subject to predetermined processing of the present invention.

In the multi-function device 10, if an error occurs when documents are stored in the confidential box 15B, that is, during scanning or FAX receive, generally, as shown in FIG. 8, fault information 19 indicating the contents (job ID, page number, cause of error) of the error is stored in the error history memory 15A.

In step ST1 of FIG. 7, documents related to the job are successively captured one page at a time from an input plug-in element (confidential box 15B) specified as a capturing destination of the rule. If all pages have been normally captured, from the next step ST2, the procedure proceeds to step ST4. If an error exists, the procedure proceeds to step ST3 from step ST2, stores the contents of the error in the error history memory 62, and proceeds to step ST4.

To be more specific, whether an error exists or not can be decided in such a way that the control device 30 refers to the error history memory 15A of the multi-function device 10 to check whether fault information 19 of the corresponding job ID exists. If an error exists, the control device 30 reads the corresponding fault information 19 from the error history memory 15A and stores it in the error history memory 62.

Alternatively, whether an error exists may be decided by reading the fault information 19 newly registered in the error history memory 15A from the multi-function device 10 and sending it to the control device 30. Alternatively, whether an error exists may be decided by determining whether pages of the captured document are normal.

In step ST4, the control device 30 determines whether the captured document is normal, on a page basis, and performs processing of a processing plug-in element set as a processing method of the rule only for pages of normal documents normally captured, and distributes the document according to distribution conditions to output plug-in elements (e.g., file folder) set as distribution destinations. Whether the document of the captured pages is normal can be easily decided by referring to the fault information 19 stored in the error history memory 62.

More specifically, in the case of the rule 4, in step ST4, format conversion is performed as required, automatic formation of erect image is made by rotating the document (images) so that the images are erected, optical character recognition (OCR) is performed, a file name is created using part of recognized characters and appended to text having been subjected to OCR processing, the images of the document are bound, and they are stored in a file folder and printed out.

Format conversion may be automatically performed based on set processing plug-in elements or performed by manual setting by an operator.

Processing of the processing plug-in elements and distribution to the output plug-in elements is repeatedly executed with wraparound to step ST4 from the next step ST5 through step ST7 until termination on pages of normal documents. However, if an error occurs midway because of, e.g., failure in format conversion, the procedure proceeds from step ST5 to step ST6, where fault information indicating the contents of the error is stored in the error history memory 62, and if pages not processed remain, returns to step ST4 through step ST7. Processing on pages in which an error occurs may be discontinued at the moment of the error or continue to distribution of output plug-in elements, with the error left intact.

Upon termination of processing of processing plug-in elements and storage to output plug-in elements on pages of normal documents, a positive decision is made in step ST7 and the procedure proceeds to step ST8.

In step ST8, the error history memory 15A is referred to and the existence of errors on the executed rule is determined from whether corresponding fault information 19 exists. If errors exist, a positive decision is made in the next step ST9, the procedure proceeds to step ST10, where the error is reported, and processing of FIG. 7 terminates.

Although an example of reporting errors at termination of a rule is shown in FIG. 7, an error may be reported each time it occurs (when a positive decision is made in steps ST2 and ST5).

Parties to which errors are reported may be users of the document shared network system 1 or users sending FAX. There is no special limitation on a method of reporting errors; for example, a message may be displayed on a display of the control device 30, or data may be sent to a predetermined terminal to display a message on a display of the terminal. Also, electronic mail indicating the occurrence of errors may be sent to a predetermined mail address, or data indicating the occurrence of errors may be stored in a predetermined file folder. Error FAX may also be sent to a FAX number of FAX sending source through a public line.

On the other hand, if no error is found as a result of determining in step ST8 whether errors exist, a negative decision is made in the next step ST9 and processing of FIG. 7 terminates immediately.

As described above, in the document shared network system 1 of this embodiment, the control device 30 is provided with the error history memory 62, and if an error occurs during rule-based processing, the control device 30 stores the contents of the error in the error history memory 62 so that rule-based processing for normal documents is continued. As a result, processing efficiency can be increased in comparison with conventional systems. On the basis of error histories of the error history memory 62, if an error exists, the contents of the error are reported. As a result, the user can recognize whether documents of all pages have been complete as a result of performing processing according to the rule.

Particularly in cases where an error exists during document input in an input plug-in element (confidential box 15B in the case of the rule 4), which functions as a start trigger of rule-based processing, the control device 30 performs control so that documents normally inputted are processed according to rules. As a result, higher processing efficiency effects are obtained in comparison with prior arts with which rule-based processing has been discontinued if an error occurs during document input. In this case, since the control device 30 obtains fault information 19 from input plug-in sides and manages it as error histories, the contents of errors during document input in input plug-in elements can also be reported.

Processing for errors during document input in input plug-in elements is described with reference to FIG. 8.

Figure 8A:
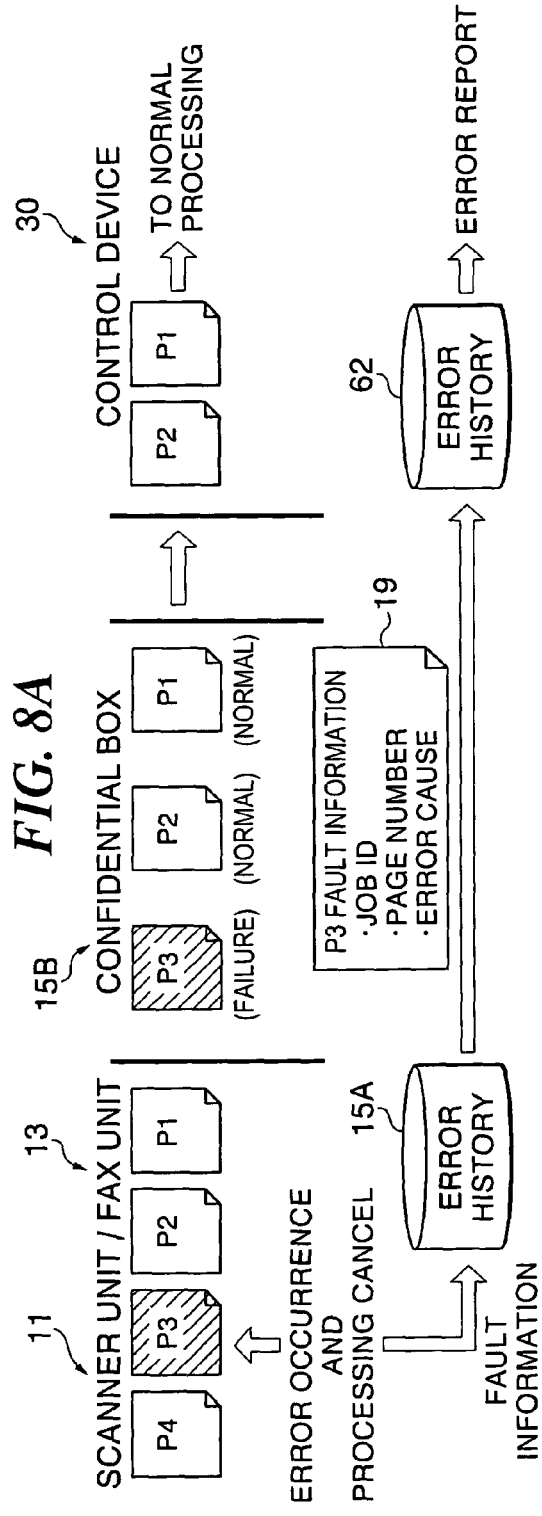
FIGS. 8A and 8B show cases where documents are scanned or subjected to FAX receive to obtain documents, and an error occurs in the middle of storing the documents in a confidential box as an input plug-in element.

FIG. 8A shows a case where an original is scanned by the scanner unit 11 or subjected to FAX receive by the FAX unit 13 to obtain documents, an error occurs in, e.g., third page of four pages in total in the middle of storing the documents in a confidential box 15B, the scanning or FAX receive is canceled, and only the first and second pages have been stored as normal documents in the confidential box 15B. FIG. 8A primarily assumes hardware errors such as a paper jam of an original being scanned, and FAX communication errors.

In this case, by performing processing as described above, the control device 30 continues rule-based normal processing for normal documents of the first and second pages captured from the confidential box 15B, obtains fault information 19 indicating the contents of the error in the third page from the error history memory 15A, and stores it in the error history memory 62 of the control device 30. On the basis of the fault information 19, it is reported to the user that the third page and following page of the four pages in total have not been processed because of a scanning error or FAX receive error.

Figure 8B:
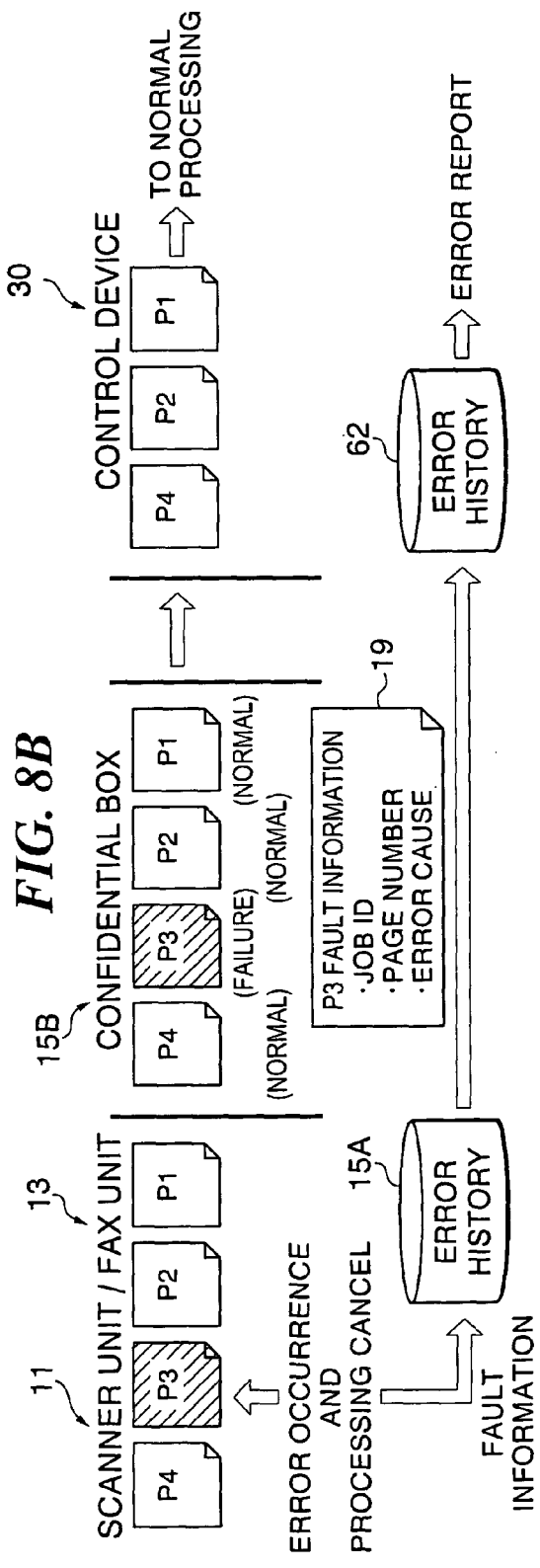

FIG. 8B shows a case where an original is scanned by the scanner unit 11 or subjected to FAX receive to obtain documents, an error occurs in, e.g., third page of four pages in total in the middle of storing the documents in a confidential box 15B, and the scanning or FAX receive is continued until the fourth page even after the error. Although FIG. 8B primarily assumes decode errors, FAX may be set to continue a receive operation during a FAX communication error.

In this case, the control device 30 continues rule-based normal processing for normal documents of the first, second, and fourth pages captured from the confidential box 15B, obtains fault information 19 indicating the contents of the error in the third page from the error history memory 15A, and stores it in the error history memory 62 of the control device 30. On the basis of the fault information 19, it is reported to the user that the third page has not been processed because of a scanning error or FAX receive error.

Thereby, if there are documents that have not been normally inputted because of errors, and documents of not all pages are complete, the user re-inputs documents unsuccessfully inputted to again perform processing only for faulty originals, and thereby can obtain results of processing for all pages.

Although the above description is made of the case where, as shown in FIG. 7, whether an error exists is decided when documents are captured from input plug-in elements (step ST2), and processing of processing plug-in and output plug-in elements is performed (step ST4) only for normal documents in which no error has been found, the present invention is not limited to this embodiment. Processing of processing plug-in and output plug-in elements may be performed for pages of captured documents whether they are normal or not. In this case, if pages of captured documents include abnormal pages unsuccessfully inputted to input plug-in elements, since the pages are decided as an error during processing in processing plug-in elements and registered in an error history, there occurs no problem in error report (step ST10).

The above description has been made of an example of applying the present invention to the document shared network system 1 as a service processing system, wherein the document shared network system 1 has the control device 30 provided on the network 5 and provides the service of performing a series of processes including document capturing, processing, and distribution according to a rule defined in advance as a work flow under control of the control device 30 through cooperation among the processes over the network 5. However, the present invention is not limited to this embodiment. Service processing systems to which the present invention applies may take any configuration if they can continuously perform a series of processes according to a work flow.

As has been described above, the present invention has the excellent effect of providing increased processing efficiency for a service processing system that provides the service of performing predetermined processes on document data through cooperation among the processes over a network.

The entire disclosure of Japanese Patent Application No. 2003-053292 filed on Feb. 28, 2003 including specification, claims, drawings and abstract is incorporated herein by reference in its entirety.

What is claimed is:

1. A service processing system providing service of performing processes using one or more identified processing units on document data through cooperation among the processing units over a network, comprising:
    a control part that continues, if an error occurs in processing a page of the document data, the processes except the page of the document data in which the error occurs, without resetting a processing unit.

2. The service processing system according to claim 1, further comprising:
    a storage part that stores error histories; and
    a report part that reports errors,
    wherein the control part, when an error occurs, registers information indicating the error in the error histories stored in the storage part, and instructs the report part to report the error on the basis of the error histories at a predetermined timing.

3. The service processing system according to claim 2, further comprising an input part that inputs the document data to be processed,
    wherein, when an error occurs during input of the document data, the control part obtains information indicating the error from the input part and stores the obtained information in the storage part.

4. A service processing method that provides service of performing processes using one or more identified processing units on document data through cooperation among the processing units over a network, the service processing method comprising:
    performing the processes on document data; and
    if an error occurs in processing a page of the document data controlling to continue the process except the page of the document data in which the error occurs, without resetting the processing unit.

5. The service processing method according to claim 4, further comprising:
    registering, when the error occurs, information about the error in error histories; and
    reporting the error on the basis of the error histories at a predetermined timing.

6. The service processing method according to claim 5, further comprising:
    obtaining information about an error occurring during input of document data from a device on the network from which the document data to be processes is input; and
    registering the error in the error histories.

7. A service processing device in a service processing system providing service of performing processes using one or more identified processing units on document data through cooperation among the processing units over a network, comprising:
    a control part that continues, if an error occurs in processing a page of the document data, the process, except the page of the document data in which the error occurs, without resetting a processing unit.

8. The service processing device according to claim 7, further comprising:
    a storage part that stores error histories; and
    a report part that reports errors, wherein the control part, when an error occurs, registers information indicating the error in the error histories stored in the storage part, and instructs the report part to report the error on the basis of the error histories at a predetermined timing.

9. The service processing device according to claim 8, further comprising an input part that inputs the document data to be processed,
wherein, when an error occurs during input of the document data, the control part obtains information indicating the error from the input part and stores the obtained information in the storage part.

10. The service processing device according to claim 7, wherein the error is a communication error during facsimile reception.

11. The service processing device according to claim 7, wherein the error is a decode error of received data or read data.

12. The service processing device according to claim 7, wherein the error is a paper jam of a read original during a reading operation by an automatic feeding device.

13. The service processing device according to claim 7, wherein, when the error occurs, if re-execution of the processes in locations concerning the error is instructed, the processes are performed again only in the locations concerning the error.

* * * * *